Patented Sept. 11, 1945

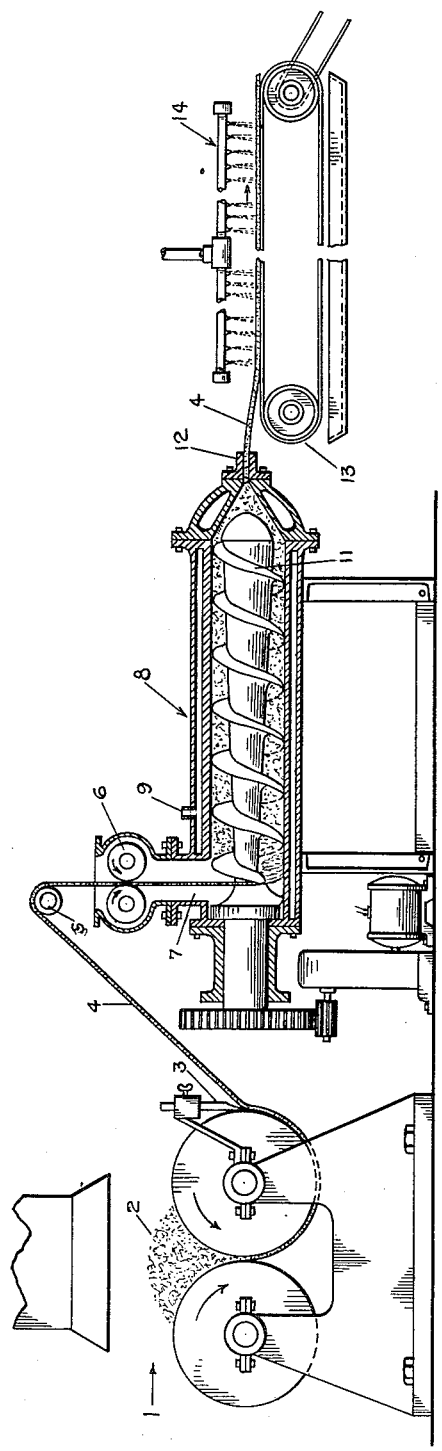

2,384,521

UNITED STATES PATENT OFFICE 2,384,521

METHOD FOR EXTRUDING THERMOPLASTIC COMPOSITIONS

Bjorn Andersen, Maplewood, N. J., and Raymond F. Strasdin, New York, N. Y., assignors, by mesne assignments, to Celanese Corporation of America, a corporation of Delaware Application April 16, 1940, Serial No. 329,858

7 Claims. (Cl. 18—55)

This invention relates to a method for extruding plastic compositions and relates more particularly to the extrusion of thermoplastic compositions.

An object of our invention is to produce extruded plastic articles having a smooth, non-scaling, glass-like surface finish.

Still another object of our invention is the production of strong, homogeneous, non-warping articles from an organic derivative of cellulose in a form free of bubbles and free of blisters.

Other objects of this invention will appear hereinafter from the following detailed description.

In the preparation of plastic compositions and particularly those comprising organic derivatives of cellulose, various methods are employed. By one method commonly employed for making plastic articles or compositions comprising organic derivatives of cellulose a plastic mass containing volatile solvents is rolled into slabs, the slabs are pressed into a block and sheets are cut from said block. After seasoning or drying to remove solvents the sheets are polished and may be used as blanks from which various articles may be stamped or formed, the articles being then subjected to various operations such as sawing, routing, drilling, polishing, molding, etc. This method of making articles of plastic compositions is costly and slow since it involves many different individual operations. Moreover, since the residual solvent in the articles is retained to a marked extent, the residual solvent tends to volatilize over a long period of time from thick portions of the articles causing said articles to blister and warp eventually. Another method of making plastic compositions containing organic derivatives of cellulose is to mold a so-called "seasoned" plastic composition containing the organic derivative of cellulose in a finely disintegrated or powdered form under heat and pressure, but grinding the materials before molding means increased cost and, moreover, is often difficult because the plastic masses tend to soften and become gummy during grinding. The molded articles, furthermore, are not entirely free from bubbles. Still another method by which articles composed of plastic compositions may be prepared, and particularly plastic compositions comprising organic derivatives of cellulose, is by the extrusion or injection of said plastic compositions while in a solvent and heat-softened state either into a mold, or through dies of a predetermined shape. By this method, solid articles may be molded and rods, sheets and tubes may be extruded.

In the prior practice, the molding composition while still containing solvent was fed at practically room temperature to a heating chamber and heat was applied to the outer walls in an attempt to soften and impart plasticity to the composition for extrusion under pressure. In attempting to heat the composition at the interior of the chamber sufficiently, it was necessary to employ high temperatures, with the result that the material near the outer walls tended to decompose while the material at the interior was not raised to a sufficiently high temperature for proper manipulation or homogenization. Since the materials were not uniformly and adequately heated throughout the mass, on leaving the extrusion nozzle their temperature was too low and variable and as a result the molded and extruded articles, even after prolonged seasoning or drying, were of poor quality and lacking strength, surface smoothness and freedom from blisters. To overcome this and in order to heat the plastic materials thoroughly and uniformly throughout their mass the heating chamber was reduced in size, and the result of this expedient was that the size of articles which could be molded or extruded was seriously limited. In addition, to obtain any greater degree of homogenization or mastication the rate of extrusion was necessarily slowed down. Where rods of about ¼ to ½ inch were extruded, they could be extruded only at a rate of about 2 to 5 feet per minute.

We have now found that if thoroughly converted and homogenized solvent-free plastic materials are fed at a constant uniform rate while hot to a stuffing or extruding machine in which the extrusion nozzle and feeding barrel are kept properly heated and the speed of the screw effectively controlled, molded and extruded products of great toughness and uniformity may be produced at speeds far higher than could be previously achieved. Moreover, products thus obtained are free of porosity, bubbles, blisters and scaliness, have a glass-like surface finish and are more resistant to attack by reagents.

The plastic compositions which may be used in accordance with our invention are those materials which are free of volatile or low boiling solvents or liquids. These plastic compositions may be made by thoroughly kneading the plastic material in the presence of plasticizers at a temperature which is sufficiently high to obtain the required plasticity, colloidization or conversion, before the same is fed at a constant uniform rate to the extrusion machine. If desired, the plastic composition may be thoroughly converted by working the material on heated rolls and may be taken off in the form of a ribbon or strip. Instead of using converting rolls to mix the plastic mass, a machine such as a "Banbury" mixer may be used to obtain a thoroughly homogeneous converted product.

While any suitable thermoplastic composition may be employed in our invention, this invention is particularly applicable to the molding of thermoplastic compositions containing organic derivatives of cellulose, such as the organic esters and ethers of cellulose. Examples of such organic esters of cellulose are cellulose acetate, cellulose propionate, cellulose butyrate or mixed esters such as cellulose acetate-propionate or cellulose acetate-butyrate, while examples of such ethers are ethyl cellulose, methyl cellulose and benzyl cellulose. Other thermoplastic compounds or bases may be used regardless of whether they retain their thermoplastic nature after being heated. Such other suitable plastic materials as phenol-formaldehyde, urea-formaldehyde, glycerol-phthalic anhydride, etc., resins and polymerized vinyl and acrylic acid derivative resins such as polymerized vinyl acetate, mixed vinyl chloride and vinyl acetate, Styrol, methyl methacrylate, etc. may be used, which plastic materials are known today in commerce under various names. It is to be understood that the term "thermoplastic" in the claims refers to all such aforementioned materials which can be molded and shaped under heat.

In addition to the plastic material, the molding compositions will preferably contain a non-volatile plasticizing or softening agent such as dimethyl phthalate, diethyl phthalate, dimethoxy ethyl phthalate, the phthalate esters of monomethyl ethers of ethylene glycol or polyglycols, dibutyl tartrate, ethyl toluene sulfonamide, triacetin, tripropionin, mixed esters of glycerol with acetic acid and propionic acid, triphenyl phosphate, etc., or mixtures of two or more of these in varying proportions. If colored effects are desired, pigments, dyes, lakes or other effect materials may be added to the colloidized plastic mass. Attractive "pearl" extruded articles containing fish scale, powdered aluminum, "H Scale," or other nacreous pigment are very economically produced by this solventless extrusion method.

To obtain the particularly desirable results of our invention, the thoroughly converted plastic mass in a heat-softened condition is fed directly and at a uniform rate to a heated extrusion device such as a heated screw stuffer. By operating the converting rolls in close proximity to the stuffer the material may be maintained at the proper temperature and fed thereto in a continuous manner. Where necessary, additional heating means may be provided to maintain the temperature of the hot moving feed. Additional rolls or a housing heated by gas flames, electric resistance coils, steam, hot oil, or other means may be used to maintain the hot feed at the desired temperature. The hot plastic mass may also be fed under pressure to the screw stuffer by means of a hydraulic stuffing machine connected directly to the hopper opening of the screw stuffer. A constant uniform pressure on the back of the screw can thus be more effectively maintained for more even extrusion.

The barrel of the stuffing device should be kept heated also. The temperature to which the barrel is heated will of course depend upon the particular plastic composition which is being treated. However, we preferably maintain the barrel temperature at from about 0° F. to about 100° F. below the flow temperature of the material as determined by the Olsen-Bakelite flow testing machine, a testing device well known in the plastic industry. In the case of cellulose acetate molding plastics, these "Olsen flow" temperatures may vary from about 240° F. to about 365° F. Very highly plasticized material may even have a lower flow temperature than 240° F., while hard and highly pigmented or filled plastics may exceed a temperature of 365° F. in the Olsen-Bakelite flow tester.

The thread of the screw in the stuffing barrel may be uniform or the thread may increase in pitch as the extrusion nozzle is approached to give a combined expressing and compression effect. The grooves of the screw may also be of variable depth diminishing as the nozzle end is reached, thereby progressively increasing the compression effect at this end. Thus, the stuffing mechanism may embody a screw or worm of uniform diameter with a variable pitch and grooves of constant depth, or the screw may have a constant pitch and grooves of variable depth. A screw with combined variable pitch and variable depth of grooves may also be employed. The screw may have a single, double, etc. thread and may be provided with means for internal cooling or heating. The barrel or inside wall of the stuffer may also have grooves at such a pitch, relative to the feed screw pitch, that there will be material in every flute of the screw in contact at all times with one or more grooves in the barrel. Otherwise, there may be a slip with intermittent pressure that would result in an uneven flow of the material at the nozzle. The nozzle end is preferably "stream lined" to facilitate rapid flow and prevent any pocketing of the material which may tend to decompose. Between the end of the screw and the nozzle head there may be inserted perforated plates to accomplish various effects as is known in the art. The nozzles may have one or a multiplicity of orifices. There may also be inserted at the end of the barrel or feed screw nozzles of other construction such as those used in injection molding machines.

The extrusion nozzle should be heated to maintain the proper flow qualities of the plastic composition to mold the surface to a glass-like finish. The nozzle temperature will, of course, vary with the particular composition which is being processed. In general, the nozzle temperature should preferably be kept at a temperature from about 50° F. to about 100° F. above the flow temperature for the material as determined by the Olsen-Bakelite flow testing machine.

The length of the nozzle through which the material is being extruded is also a factor in obtaining our desirable results. If the nozzle is too long an excessive amount of friction will result and if the nozzle is too short the extruded product will not be properly formed. Nozzles of from about ½ to about 18 inches in length have been found suitable, the length depending to a large extent on the cross-sectional area of the articles being extruded.

At the elevated temperatures at which the materials leave the extrusion nozzle, the extruded products must be cooled down as quickly as possible in order that they may be able to support their own weight without deformation. The solidified product may be suspended in air or transported by means of a belt conveyor and suitable cooling means such as refrigerated air, gas or water are provided to cool the extruded product.

After cooling, the extruded products may then be cut to any desired length.

In order to further illustrate our invention, but without being limited thereto, the following examples are given:

Example I

A plastic mass containing 100 parts by weight of cellulose acetate, 30 parts of diethyl phthalate and 10 parts of triphenyl phosphate, is melted and thoroughly converted and homogenized on hot rolls without the use of any solvent. The hot thoroughly plasticized material is removed from the plasticizing rolls and fed to a small set of hot rolls close to the throat of a screw stuffer. The plastic composition which has an Olsen-Bakelite flow temperature of about 307° F. enters the screw stuffer in the form of a continuous ribbon and is maintained in a heated condition by heating the barrel of the screw stuffer by means of steam to a temperature of about 270° F. A double-thread screw, operating at 20 revolutions per minute forces the softened material forward through a heated extrusion nozzle approximately 6 inches long heated by means of an electric resistance coil to about 400° F. The hot material in the form of a rod is carried from the extruding machine by a conveyor and simultaneously rapidly cooled by cold water.

The rod produced is exceptionally glass-like in smoothness, free from brittleness, swelling and blisters. The rate of extrusion of such rods is from about 25 to 30 feet per minute.

Example II

A plastic mass containing 100 parts by weight of cellulose acetate, 20 parts of dimethoxy ethyl phthalate and 10 parts of a pigment or filler, is melted and thoroughly converted and homogenized as described in Example I. The plastic composition has an Olsen-Bakelite flow of about 365° F. and is fed in a hot and thoroughly plasticized condition to a screw stuffer in which the barrel is maintained at a temperature of approximately 325° F. and the nozzle maintained at approximately 460° F. The hot extruded rod is carried from the machine, rapidly cooled and cut to the desired lengths. This hard, tough rod is exceptionally smooth and free of swelling and blisters.

Example III

A plastic mass containing 100 parts by weight of cellulose acetate and 65 parts of a plasticizer composed of 10% dimethyl phthalate, 30% dimethoxy ethyl phthalate and 60% mono methyl mono methoxyethyl phthalate, are converted and homogenized thoroughly on hot rolls as described. The hot composition, having an Olsen-Bakelite flow temperature of 242° F., is fed to a screw stuffer in which the barrel is maintained at about 230° F. and the nozzle maintained at about 310° F. The rod extruded from this machine has a smooth glass-like finish and is free from blisters, swelling and scaliness.

In the accompanying drawing the figure represents, more or less diagrammatically, one form of apparatus for carrying out the invention.

In the drawing, reference numeral 1 indicates generally a malaxating roll apparatus for melting, converting and homogenizing plastic material 2, a knife 3 stripping the material from the hot rolls in the form of a web or ribbon 4 which passes over a guide roller 5, between a pair of hot rollers 6 into the throat 7 of a jacketed screw stuffer, generally indicated by reference numeral 8, which may be heated by steam entering the jacket through a port 9. The screw 11 of the screw stuffer forces the softened material forward through an extrusion nozzle 12 which may be heated in any suitable manner. The hot material in the form of a rod is carried from the extrusion machine by means of a conveyer which may comprise an endless belt device generally indicated by reference numeral 13. The extruded rod may be cooled by cold water in any suitable manner as shown at 14.

While the present invention has been particularly described in connection with the manufacture of rods from cellulose acetate, it is obvious that other articles such as tubes, slabs and the like can also be made in accordance with this invention and from other plastic materials.

It is to be understood that the foregoing detailed description is merely given by way of illustration and that many variations may be made therein without departing from the spirit of our invention.

Having described our invention, what we desire to secure by Letters Patent is:

1. Method of forming smooth, glass-like, tough and blister-free non-warping articles of thermoplastic materials, which comprises homogenizing and converting an organic derivative of cellulose composition in the absence of volatile solvents at an elevated temperature, feeding the heated converted composition to a space heated to a temperature of about 0° F. to about 100° F. below the Olsen-Bakelite flow test temperature for said organic derivative of cellulose composition and forcing the heated composition through a passage heated to a temperature of about 50° F. to about 100° F. above said flow test temperature.

2. Method of forming smooth, glass-like, tough and blister-free non-warping articles of thermoplastic materials, which comprises homogenizing and converting a cellulose acetate composition in the absence of volatile solvents at an elevated temperature, feeding the heated converted composition to a space heated to a temperature of about 0° F. to about 100° F. below the Olsen-Bakelite flow test temperature for said cellulose acetate composition and forcing the heated composition through a passage heated to a temperature of about 50° F. to about 100° F. above said flow test temperature.

3. Method of forming smooth, glass-like, tough and blister-free non-warping articles of thermoplastic materials, which comprises homogenizing and converting an organic derivative of cellulose composition in the absence of volatile solvents at an elevated temperature, feeding the heated converted composition at a constant uniform rate to a space heated to a temperature of about 0° F. to about 100° F. below the Olsen-Bakelite flow test temperature for said organic derivative of cellulose composition and forcing the heated composition under pressure through a passage heated to a temperature of about 50° F. to about 100° F. above said flow test temperature, the pressure applied to the heated composition being progressively increased as the material approaches the end of said passage.

4. Method of forming smooth, glass-like, tough and blister-free non-warping articles of thermoplastic materials, which comprises homogenizing and converting a cellulose acetate composition in the absence of volatile solvents at an elevated temperature, feeding the heated converted composition at a constant uniform rate to a space heated to a temperature of about 0° F. to about 100° F. below the Olsen-Bakelite flow test temperature for said cellulose acetate composition and forcing the heated composition under pressure through a passage heated to a temperature of about 50° F. to about 100° F. above said flow test temperature, the pressure applied to the heated composition being progressively increased as the material approaches the end of said passage.

5. Method of forming smooth, glass-like, tough and blister-free non-warping articles of thermoplastic materials, which comprises homogenizing and converting a mixture of the thermoplastic material with a plasticizer therefor by working while hot in the absence of volatile solvents, feeding the homogeneous and converted mixture while substantially uniformly hot throughout to a heated space at a temperature no greater than the Olsen-Bakelite flow test temperature of the mixture, forming the article by extruding the mixture from said space through a heated passage in which the temperature is substantially above the Olsen-Bakelite flow test temperature of the mixture and rapidly cooling the article as it emerges from said passage.

6. Method of forming smooth, glass-like, tough and blister-free non-warping articles of thermoplastic materials, which comprises homogenizing and converting a mixture of an organic derivative of cellulose with a plasticizer therefor by working while hot in the absence of volatile solvents, feeding the homogeneous and converted mixture while substantially uniformly hot throughout to a heated space at a temperature no greater than the Olsen-Bakelite flow test temperature of the mixture, forming the article by extruding the mixture from said space through a passage in which the temperature is about 50 to 100° F. above the Olsen-Bakelite flow test temperature of the mixture and rapidly cooling the article as it emerges from said passage.

7. Method of forming smooth, glass-like, tough and blister-free non-warping articles of thermoplastic materials, which comprises homogenizing and converting a mixture of cellulose acetate with a plasticizer therefor by working while hot in the absence of volatile solvents, feeding the homogeneous and converted mixture while substantially uniformly hot throughout to a heated space at a temperature no greater than the Olsen-Bakelite flow test temperature of the mixture, forming the article by extruding the mixture from said space through a passage in which the temperature is about 50 to 100° F. above the Olsen-Bakelite flow test temperature of the mixture and rapidly cooling the article as it emerges from said passage.

BJORN ANDERSEN.
RAYMOND F. STRASDIN.